United States Patent [19]

Ferkinhoff et al.

[11] Patent Number: 5,581,490
[45] Date of Patent: Dec. 3, 1996

[54] CONTACT MANAGEMENT MODEL ASSESSMENT SYSTEM FOR CONTACT TRACKING IN THE PRESENCE OF MODEL UNCERTAINTY AND NOISE

[75] Inventors: David J. Ferkinhoff, Middletown; John G. Baylog, Tiverton; Kai F. Gong, Pawtucket, all of R.I.; Kathleen D. Keay, Fairhaven, Mass.; Sherry E. Hammel, Little Compton, R.I.

[73] Assignee: The United States of America as represented by the Secretary of the Navy, Washington, D.C.

[21] Appl. No.: 353,853

[22] Filed: Dec. 9, 1994

[51] Int. Cl.⁶ ............................... G01S 7/66; G06F 19/00
[52] U.S. Cl. ........................... 364/578; 364/574; 364/517
[58] Field of Search ................................... 364/578, 567, 364/516, 574, 421, 517; 395/50

[56] References Cited

U.S. PATENT DOCUMENTS

| 4,893,262 | 1/1990 | Kalata | 364/567 |
| 5,233,541 | 8/1993 | Corwin et al. | 364/516 |
| 5,258,924 | 11/1993 | Call et al. | 364/516 |
| 5,373,456 | 12/1994 | Ferkinhoff et al. | 364/574 |
| 5,475,589 | 12/1995 | Armitage | 364/421 |

OTHER PUBLICATIONS

"Maneuvering Target Tracking using Jump Processes", by S. Lim and M. Farooq, IEEE, Decision and Control, 1991 30th Annual Conference, Jul. 1991, pp. 2049–2054.

*Primary Examiner*—Gary Chin
*Assistant Examiner*—Russell W. Frejd
*Attorney, Agent, or Firm*—Michael J. McGowan; Michael F. Oglo; Prithvi C. Lall

[57] ABSTRACT

A system for providing an iterative method of assessing accuracy of selected models of physical phenomena and for determining selection of alternate models in response to a data sequence in the presence of noise. Initially, a residual sequence is generated reflecting difference values between in response to said data sequence and an expected data sequence as would be represented by a selected model. Feature estimate values of a plurality of predetermined data features in the residual sequence are then generated. In response to the feature estimate values, a threshold value is generated for each feature at an estimated ratio of data to noise power. Probability values are generated in response to the threshold value, representing the likelihood that the feature exists in the data sequence, does not exist in the data sequence, and that the existence or non-existence in the data sequence is not determinable, along with an amplitude probability value indicating the belief of the amplitude of the respective feature in the data sequence. Probability values are generated in response to the feature existence and amplitude probability values, representing the likelihood that various modelling hypotheses are represented by the observed features, or are not ruled out by the observed features in the presence of the given noise level. Finally, a model is selected in response to the probability values for use during a subsequent iteration.

21 Claims, 10 Drawing Sheets

FIG. 4

|  |  | $\Theta_{JD}$ |
|---|---|---|
| $\Theta_j$ | F' | F', D |
|  | F | J, JD |
|  | F', F | F', J, D, JD |
| $\Theta_d$ | F' | F', J |
|  | F | D, JD |
|  | F', F | F', J, D, JD |

FIG. 5

| $\Theta_d$ \ $\Theta_j$ | $m_j(F', D)$ | $m_j(J, JD)$ | $m_j(\Theta_F)$ |
|---|---|---|---|
| $m_d(F', J)$ | $m_c(F')$ | $m_c(J)$ | $m_c(F', J)$ |
| $m_d(D, JD)$ | $m_c(D)$ | $m_c(JD)$ | $m_c(D, JD)$ |
| $m_d(\Theta_F)$ | $m_c(F', D)$ | $m_c(J, JD)$ | $m_c(\Theta_F)$ |

FIG. 6

| $\Theta_{JD}$ | $\Theta_{JDwms}$ |
|---|---|
| {J} | {Jw, Jm, Js} |
| {D} | {Dw, Dm, Ds} |
| {JD} | {JwDw, JwDm, JwDs, ...,JsDs} |
| {F'} | {F'} |

130. DETERMINE PROBABILITY VALUE THAT FEATURE EITHER DOES EXIST OR DOES NOT EXIST IN THE DATA SEQUENCE BY ADDING PREVIOUSLY-DETERMINED PROBABILITY VALUE THAT FEATURE DOES EXIST AND PROBABILITY VALUE THAT FEATURE DOES NOT EXIST.

131. DETERMINE PROBABILITY VALUE THAT EXISTENCE OF FEATURE CANNOT BE DETERMINED BY SUBTRACTING SUM FROM UNITY.

CONTACT MANAGEMENT MODEL ASSESSMENT SYSTEM FOR CONTACT TRACKING IN THE PRESENCE OF MODEL UNCERTAINTY AND NOISE

STATEMENT OF GOVERNMENT INTEREST

The invention described herein may be manufactured by or for the Government of the United States of America for Governmental purposes without the payment of any royalties thereon or therefor.

BACKGROUND OF THE INVENTION (1) Field of the Invention

The invention relates generally to the field of systems and methods for determining models describing motion of vehicles and environmental and sensor characteristics in the presence of model uncertainty and noise. In a preferred embodiment, the invention facilitates selection of the physical processes relating to motion of a signal source moving in a medium, the propagation of the signal through the medium and the interception of the signal by the sensors being in response to received signals which may be corrupted by noise.

(2) Description of the Prior Art

Expert systems can be used to identify likely models of physical phenomena in response to information about the state of the phenomena, particularly where the information is corrupted by noise.

J. Baylog, et al., "Underwater Tracking In The Presence of Modeling Uncertainty," Proc. 21st Asilomar Conference On Signals, Systems And Computers, November 1987, (hereinafter "Baylog, et al.") (incorporated by reference) and D. Ferkinhoff, et al., "Feature Extraction And Interpretation For Dynamic System Model Resolution," Proc. 24th Asilomar Conference On Circuits, Systems And Computers, November 1990, (hereinafter "Ferkinhoff, et al., I") (incorporated by reference) generally describe a system which is used to model the motion of an object through a fluid in response to information which is received by arrays of acoustic sensors placed in the fluid. The acoustic sensors receive acoustic signals which arise from motion of the object through the fluid, or which may be emitted by the object as it propels itself through the fluid. The particular types of sensors in the array may be selected to detect certain types of information. For example, sensors may be selected to provide the azimuth bearing of the object relative to the sensor, the angle of depression or elevation of the object relative to the location of the sensor, and the frequency of the signal. Information from these sensors may be used to provide evidence to support models representing the motion of the object through the fluid.

One problem that arises in determining the likelihood that particular models accurately represent physical processes, including the motion of the target object, is that the sensors are likely to receive not only the signals as generated by the moving physical process or object, but also noise. Indeed, noise may be due not only to acoustic signals generated by other objects than the one being modeled, but also by reflections of the signals being generated by the object being modeled off of discontinuities in the fluid, such as off the ocean floor or surface, resulting in multi-path distortion. Depending on the relative levels of the signals and the noise, certain features which are present in the signals which are used to make the determination may be masked by the noise, or at least their detection may be difficult.

D. Ferkinhoff, et al., "Evidence Generation And Representation For Model Uncertainty Management In Nonlinear State Estimation," Proc. 25th Asilomar Conference On Circuits, Systems and Computers, November 1991, (incorporated by reference), describes a system which seeks to solve this problem by using a residual sequence generated that reflects difference values between said data sequence and an expected data sequence as would be represented by a selected model. The residual values and other information are used to generate a multitude of probability values representing the belief that pertinent identifiable features exist in the data sequence, and also values representing the belief that they do not exist in the data sequence, and further values representing the belief that the existence or non-existence of the features in the data sequence is not determinable. The belief is used to select an alternate model and the data sequence is processed again in response to that selected model. The process is repeated to verify the model selection.

SUMMARY OF THE INVENTION

It is therefore an object of the invention to provide a system for providing an enhanced modeling of physical phenomena in response to signals in the presence of noise.

In brief summary, the invention in one aspect provides a system for assessing accuracy of selected models of physical phenomena and for determining selection of alternate models in response to a data sequence in the presence of noise comprising a residual value generator, a feature estimate determination module, a threshold determination module, a feature probability value generator, an evidence interpretation module, a model selection module and a control module. The residual value generator generates a residual sequence reflecting difference values between the data sequence and an expected data sequence as would be represented by a selected model. The feature estimate determination module generates feature estimate values of a plurality of predetermined data features in the residual sequence generated by the residual value generator. The threshold determination module generates, in response to the feature estimate values generated by the feature estimate determination module, a threshold value for each feature at an estimated ratio of signal power to noise power. The feature probability value generator generates, in response to the threshold and data noise values, probability values representing the belief or likelihood that the features exist in the data sequence, that the features do not exist in the data sequence, and that the existence or non-existence of the features in the data sequence is not determinable, along with an amplitude belief value indicating the belief that the amplitude of the respective features in the data sequence fall within empirically defined regions. The evidence interpretation module performs the functions of interpreting the features, or absence thereof, to determine the model or models which could have caused the observed features in the data set. In addition, it accumulates the belief values associated with the features, as determined by the feature probability value generator, and assigns and accumulates these beliefs to be associated with the hypothetical model or models. The model selection module selects a model or set of models in response to the belief value determined by the evidence interpretation module. Finally, the control module controls the operations of the residual value generator, the feature estimate determination module, the threshold determination module, the feature probability value generator and the model selection module in a plurality of iterations, during each iteration the residual value generator module using the model selected by the model selection module during the previous iteration.

In another aspect, the invention provides an iterative method of assessing accuracy of selected models of physical phenomena and for determining selection of alternate models in response to a data sequence in the presence of noise. Initially, in response to a received data sequence a residual sequence is generated reflecting difference values between the data sequence and an expected data sequence as would be represented by a selected model. Feature estimate values of a plurality of predetermined data features in the residual sequence are then generated. In response to the feature estimate values, a threshold value is generated for each feature at an estimated ratio of data to noise power. Probability values are generated in response to the threshold and ratio values, representing the likelihood that the feature exists in the data sequence, does not exist in the data sequence, and that the existence or non-existence in the data sequence is not determinable, along with an amplitude belief value indicating the belief of the amplitude of the respective feature in the data sequence. Finally, a model or set of models are selected in response to the probability values for use during a subsequent iteration.

In yet another aspect, the invention provides a system for use in connection with a computer to assess accuracy of selected models of physical phenomena and for determining selection of alternate models in response to a data sequence in the presence of noise comprising a residual value generator module, a feature estimate determination module, a threshold determination module, a feature probability value generator module, a feature interpretation module, a model selection module, and a control module. The residual value generator module controls the computer to generate a residual sequence reflecting difference values between the data sequence and an expected data sequence as would be represented by a selected model. The feature estimate determination module controls the computer to generate feature estimate values of a plurality of predetermined data features in the residual sequence. The threshold determination module controls the computer to generate, in response to the feature estimate values, a threshold value for each feature at an estimated ratio of data to noise power. The feature probability value generator module controls the computer to generate, in response to the threshold and ratio values for each feature, probability values representing the likelihood that the feature exists in the data sequence, does not exist in the data sequence, and that the existence or non-existence in the data sequence is not determinable, along with an amplitude belief value indicating the belief of the amplitude of the respective feature in the data sequence. The feature interpretation module controls the computer to interpret the features, in response to the probability values, to determine the model or models that could have caused the observed features, and to accumulate the feature probabilities into model probabilities or beliefs. The model selection module controls the computer to select a model in response to the probability values. The control module controls the operations of the computer in response to the residual value generator module, the feature estimate determination module, the threshold determination module, the feature probability value generator module and the model selection module in a plurality of iterations. During each iteration, the computer, in response to the residual value generator module, uses the model or set of models selected in response to processing by the model selection module during the previous iteration.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2 through 8 are figures helpful in understanding the operation of the system depicted in FIG. 1.

DETAILED DESCRIPTION OF THE PREFERRED EMBODIMENT

Figure 1:
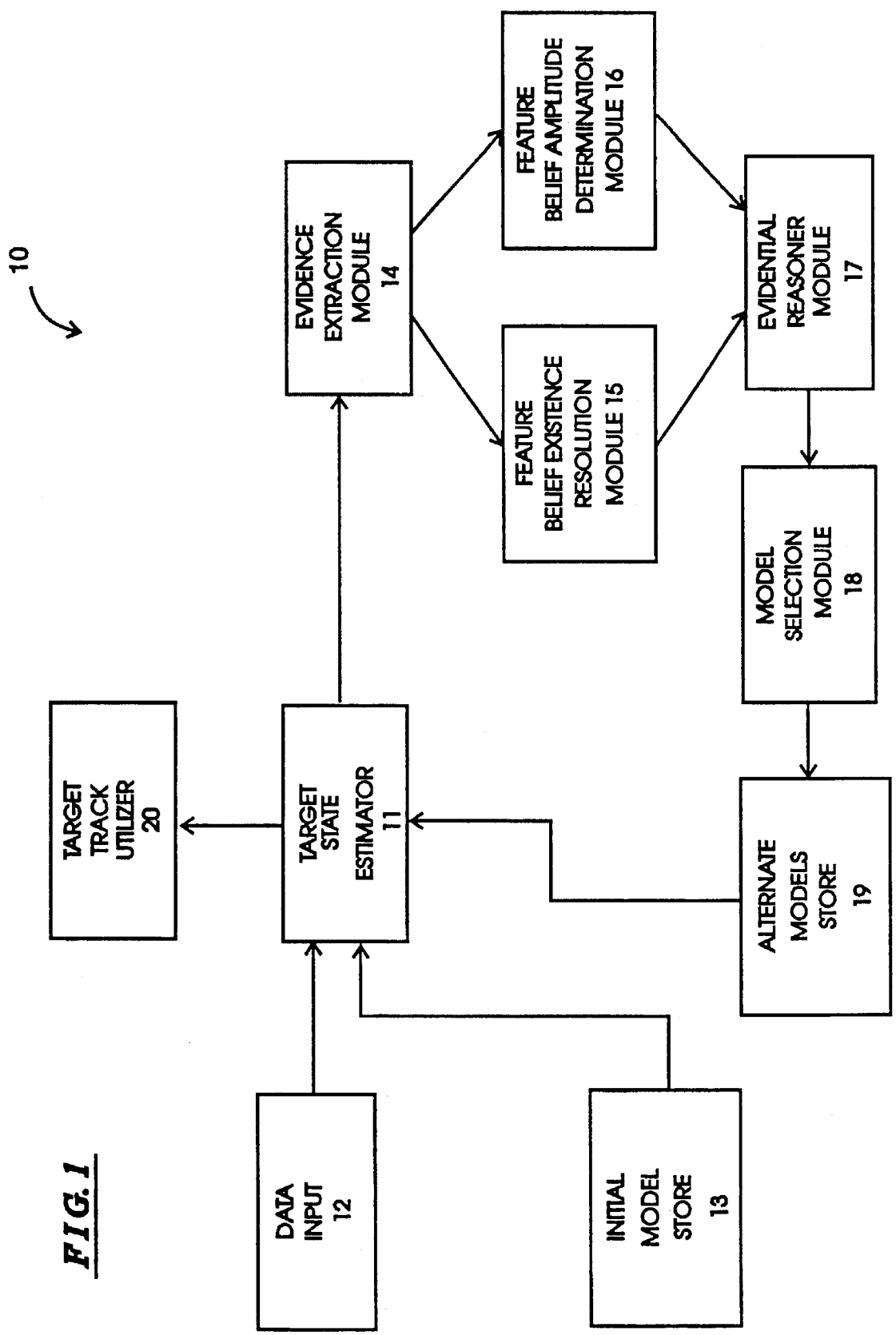
FIG. 1 depicts a functional block diagram of a model assessment system constructed in accordance with the invention.

FIG. 1 depicts a functional block diagram of a model assessment system 10 constructed in accordance with the invention. With reference to FIG. 1, the system 10 includes a target state estimator module 11 which receives input data from a sensor array through a data input 12 and initially receives initial target motion, environmental condition and sensor models from an initial model store 13. With respect to one particular embodiment of the target state tracking system, the input data received through the data input represents the values of signals from various acoustic sensors (not shown) which provide an indication of various angular relationships of received acoustic signals with respect to the positions of the sensors and the frequencies of the received acoustic signals. The target state estimator module 11 processes the data representing the signals in connection with an initial model set it receives from the initial model store 13 and generates target state estimate data, a by-product of which is the generation of residual values, all of which it provides to an evidence extraction module 14. The initial model set received from the initial model store comprises parameter values which represent the values of the data input which would be expected if the target were on an estimated track in the presence of noise; in one embodiment, the initial model set comprises a null-hypothesis model, which represents a non-varying signal hypothesis, that is, a model which produces residuals that have no features contained therein.

The evidence extraction module 14 processes residual values indicating the differences between the target state estimation data and the actual input data to extract parameter estimates relating to a set of predetermined features, and provides them to a feature belief existence resolution module 15 and a feature belief amplitude determination module 16 to determine probability (belief) values representing the likelihood that selected features that are present in the residual values representing the input data, which are not reflected in the initial model set received from the initial model store, which features include, for example, a generally linear drift of the signal, a discontinuity or jump in the signal, or a non-linear or curvature of the signal. The feature belief existence resolution module 15, which will be described in more detail below, generates the belief values indicating the belief that each respective feature exists in the data, and in so doing determines not only the probabilities that such features are present or are not present, but also determines a probability value representing the likelihood that it cannot determine whether a feature exists because of noise in the signal representing fluctuations in the data values. The feature belief amplitude determination module 16, which will be described in more detail below, generates belief values indicating the belief that the feature parameter estimates fall within empirically defined regions.

The belief values for the various features jump, drift, and jump and drift (that both features are present), include belief values that the feature(s) exists, does (do) not exist and is (are) not determinable, along with the belief values for the amplitudes of the various features, are combined and used by an evidential reasoner module 17 and a model selection module 18 to select alternate tracking model data representing one or more alternate tracking models from an alternate model store 19. The various modules of the target tracking system then repeat the above-described operations using the alternate tracking model parameter values for each of the selected alternate tracking models. The system 10 performs these operations iteratively, during each iteration the target state estimator module 11 processing the input data in relation to the alternate tracking model data for the alternate tracking models which the model selection module had selected during the previous iteration, until the smallest set of tracking models which produce consistent results is identified. Thereafter, the target state estimator module 11 may provide the identified target tracking models to a utilization device 20, which may utilize the target state information, to, for example, further process the target state information provided by the target state estimator, generate an alarm indication or display the information for an operator (not shown).

It will be appreciated that the various modules of the system 10 depicted in FIG. 1 may be implemented using special purpose hardware and/or one or more suitably programmed general purpose computers.

Before preceding further, it would be helpful to describe the evidential reasoning methodology used by one embodiment of the invention. In one embodiment, a "Dempster-Shafer" evidential reasoning methodology is used, in which "belief" values are apportioned over a frame of discernment based on evidence discerned from the data. A frame of discernment, Θ, is a set of mutually exclusive and exhaustive hypotheses which a set of data may represent. For example, in a frame of discernment Θ containing three mutually exclusive and exhaustive hypotheses, $H_i$, (each of which may represent, for example, a feature of no change, jump, or drift) the frame is represented by $\Theta=\{H_1, H_2, H_3\}$.

Figure 2:
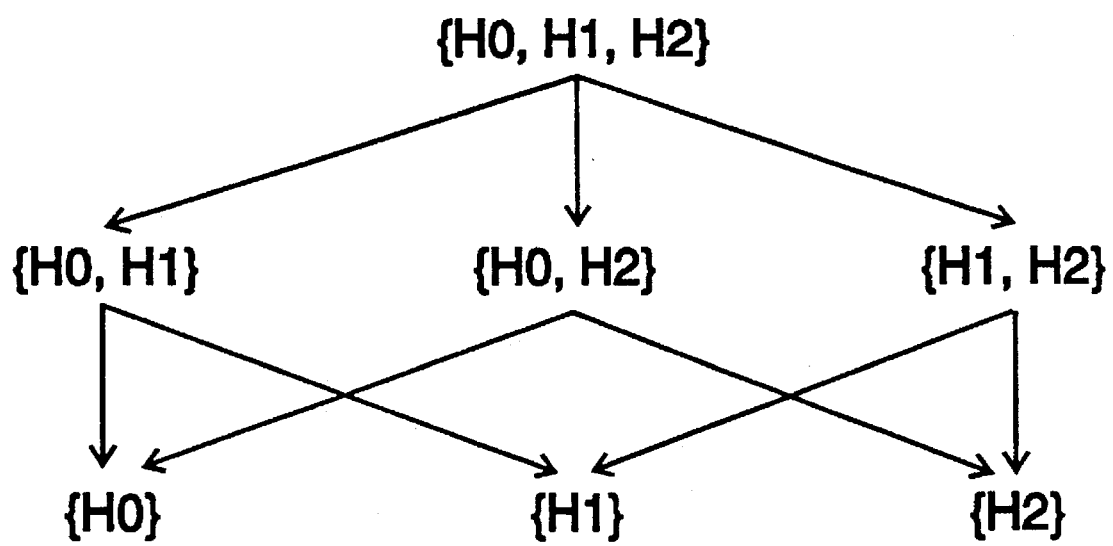

A "power set" $2^\Theta$ is formed as a collection of all subsets ($A_i$) of the frame of discernment Θ. A power set for the three-hypothesis frame of discernment $\{H_1, H_2, H_3\}$ is shown in FIG. 2. With reference to FIG. 2, the power set is depicted as a tree. Each of the lower elements in the tree, termed "singletons," represents the degree of belief, based on evidence discerned from the data, that the individual hypotheses $\{H_1\}$, $\{H_2\}$ and $\{H_3\}$ is correct. Each element in the intermediate level represents the degree of belief in pairs of hypotheses ("doublets") $\{H_0, H_1\}$, $\{H_0, H_2\}$, and $\{H_1, H_2\}$, that is, the belief that at least one member of the pair is the correct hypothesis, but the evidence discerned from the data indicates that both members appear to be equally likely. Finally, the triplet $\{H_0, H_1, H_2\}$ at the upper level represents the degree of belief that at least one member $H_0$, $H_1$ or $H_2$ is the correct hypothesis, but the specific hypothesis which is the correct one cannot be determined from the data; the triplet effectively represents the complete inability to determine which of the hypotheses $H_0$, $H_1$ or $H_2$ is the correct hypothesis.

The belief that one of the hypotheses $H_0$, $H_1$ or $H_2$ in one of the subsets $A_i$ is correct is represented by the basic probability assignment ("BPA"), which is denoted $m(A_i)$. Basic probability assignments are given to all elements of the power set (FIG. 2), subject to the constraints that the values of individual BPA's are all between zero and one and that the summation of all the individual BPA's is unity. The support $S(A_i)$ for a particular subset $A_i$ is the sum of the basic probability assignments $m(A_i)$ over all subsets of $A_i$ (for example, the subsets of a doublet $\{H_j, H_k\}$ are the doublet itself and the singletons $\{H_j\}$ and $\{H_k\}$), or $$S(A_i) = \sum_{a \subset A_i} m(a) \tag{1}$$

and the plausibility of $A_i$ is the lack of disbelief in $A_i$, or $$Pl(A_i) = 1 - S(\overline{A_i}) = 1 - \sum_{a \cap A_i} m(a) \tag{2}$$

If several bodies of evidence $E_1$, $E_2$, exist for a particular frame of discernment $\Theta=\{H_0, H_1, H_2\}$, the beliefs $m_1(A_i)$ and $m_2(A_i)$ resulting from each body of evidence can be combined using Dempster's combination rule:

$$m_c(A_i) = \frac{1}{\alpha} \sum_{A_j \cap A_k \subset A_i} m_1(A_j) m_2(A_k) \tag{3}$$

where α is a normalization constant determined as $$\alpha = 1 - \sum_{A_j \cap A_k = \Phi} m_1(A_j) m_2(A_k) \tag{4}$$

where "Φ" represents the null intersection.

As noted above, the feature belief existence resolution module 15 generates belief values indicating the likelihood that a feature such as jump, drift, or jump and drift, is present in the data received from the sensors, and a feature belief amplitude determination module 16 generates values indicating, if a particular feature is present, a belief value representative of the amplitude of the feature. (Hypothesis "jump and drift" in the frame of discernment is considered separate from hypothesis "jump" and hypothesis "drift", since hypothesis "jump" is considered to represent the condition that only the "jump" feature is present in the data, and the hypothesis "drift" is considered to represent the condition that only the "drift" feature is present. While the jump and drift features may both be present in the data, since the hypotheses "jump" and "drift" are mutually exclusive, a hypothesis "jump and drift" is used to represent the condition when both features jump and drift are present in the data.)

Figure 3:
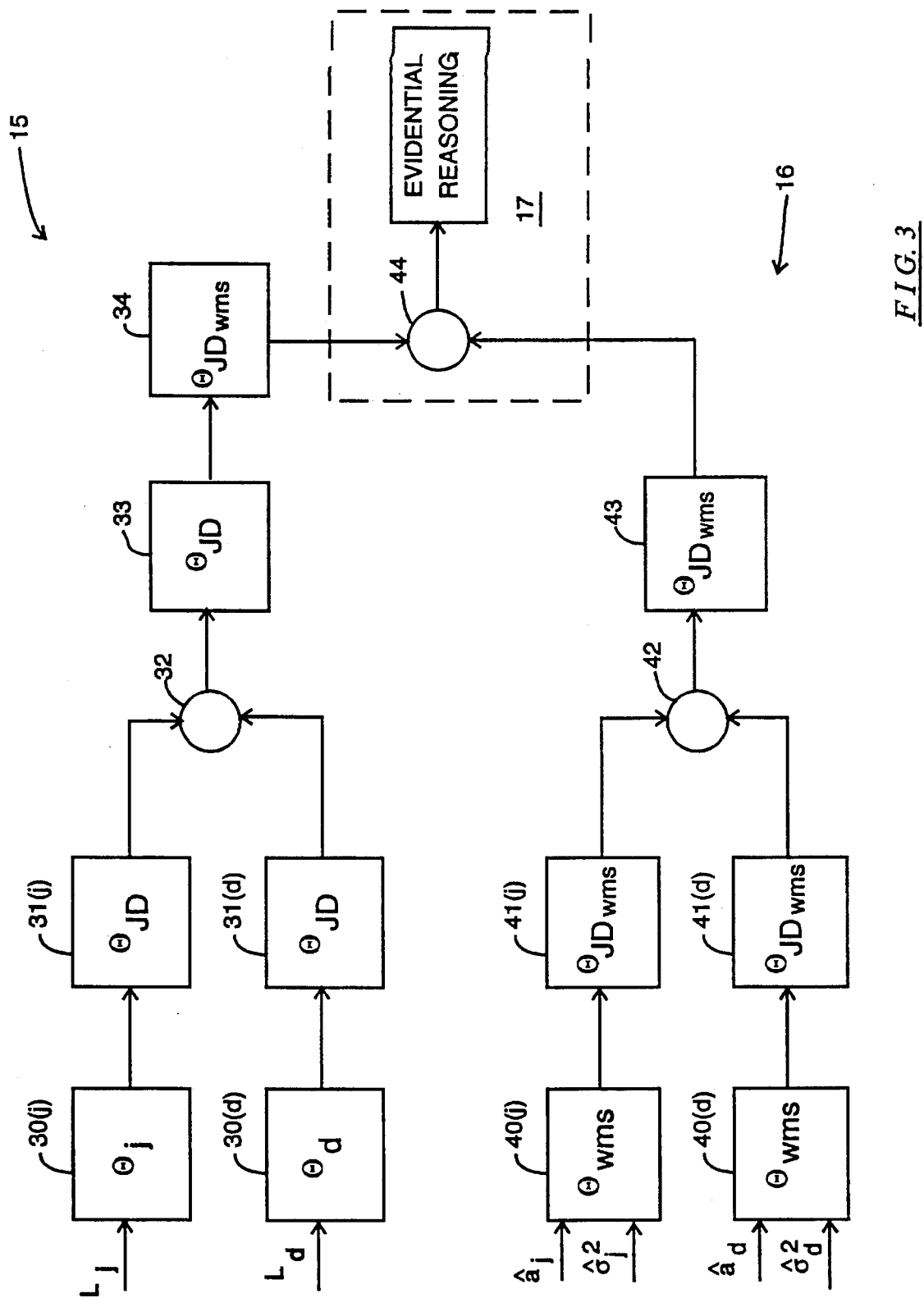

The operations performed by the modules 15 and 16 will be described with reference to the block diagram of FIG. 3. FIG. 3 generally depicts, in block diagram form, the basic operations performed by the feature belief existence resolution module 15 and the feature belief amplitude determination module 16 in generating the respective belief values.

In this connection, the modules 15 and 16 make use of several levels of frames of discernment. At a first level, the feature belief existence resolution module 15 uses an individual feature frame $\Theta_i=\{$no feature (F'), feature (F)$\}$, where the subscript "i" indicates "jump" or "drift," "no feature" represents the hypothesis that the feature (jump or drift) for the "i-th" frame of discernment is not present, and "feature" represents the hypothesis that the feature is present. (The particular manner in which feature belief existence resolution module 15 generates the belief values for the individual feature frames $\Theta_i$ will be described below.) A second level is composed of composite feature frames of discernment $\Theta_{JD}=\{$no features (F'), jump only (J), drift only (D), jump and drift (JD)}. Belief values for the various elements of the composite frame are generated from the belief values generated for the individual feature frames $\Theta_i$ as represented in the table shown in FIG. 4.

With reference to FIG. 4, the upper portion of the table, identified at the left by $\Theta_j$, indicates how the various hypotheses of the lowest level frame $\Theta_j$ for the "jump" feature map into the elements of the composite frame $\Theta_{JD}$. In particular, the "no feature" hypothesis (which indicates the belief that the "jump" feature is not present) is consistent with the hypotheses in the composite frame $\Theta_{JD}$ of "no feature" (that is, that neither the jump feature nor the drift feature is present) and "drift" (since, although the jump feature would not be present for the "no feature" hypothesis of the jump feature frame $\Theta_j$, the drift feature may be present). The other rows of the table, representing how the belief values of the various hypotheses of the lowest level frames $\Theta_j$ and $\Theta_d$ map into the composite frame $\Theta_{JD}$, are generated using similar reasoning. The actual belief values for the hypotheses in the composite frame $\Theta_{JD}$ are generated from the belief values determined for the hypotheses in the lowest level frames $\Theta_j$ and $\Theta_d$ (as will be described below) using equations 3 and 4, as shown in FIG. 5.

In addition, the hypotheses of the composite frame $\Theta_{JD}$ are mapped into a higher-level composite frame $\Theta_{JDwms}$, representing belief relating to the amplitude of the various hypotheses "no feature," "jump," and "jump and drift" as shown in the table depicted in FIG. 6. Note, for instance, that, although the feature belief resolution module 15 can determine the existence or non-existence of a jump, it cannot determine the amplitude of the jump in an absolute sense. Thus, the hypothesis that a jump occurred, "{j}," maps to the hypotheses that a weak, moderate or strong jump likelihood is present $\{J_w, J_m, J_s\}$. (Features "weak," "moderate" and "strong" are also used by feature belief amplitude determination module 16 in connection with its generation of amplitude belief values, as will be described below.) Thus, for example, a belief in the "jump" hypothesis is, as shown in the top row of the table in FIG. 6, mapped into weak ("Jw"), moderate ("Jm") or strong ("Js") amplitude hypotheses in the higher-level composite frame $\Theta_{JDwms}$.

As noted above, feature belief amplitude determination module 16 uses a separate individual feature frame of discernment $\Theta_{wms}$, which maps evidence into belief values that the amplitude of the individual feature falls into an amplitude region (weak "w", moderate "m", or strong "s") for the particular feature. The particular manner in which the module 16 generates the belief values for the various regions will be described below. The module 16 also makes use of a composite frame $\Theta_{JDwms}$, mapping the belief values generated for the individual feature frames into the composite frame in a similar matter as depicted in FIG. 6.

With reference again to FIG. 3, the feature belief existence resolution module 15 receives the residual value information at first order frame blocks 30(j) ("j" corresponds to "jump") and 30(d) ("d" corresponds to "drift"). (Hereinafter, in the specification blocks 30(j) and 30(d) are generally identified by reference numeral 30(i), where "i" corresponds to "jump" or "drift.") Each of the first order frame blocks 30(i) generates (in a manner to be described below) belief values representing the probability that the respective feature (jump or drift) is present in the data {F}, and the probability that the respective feature is not present in the data {F'}, and assigns those belief values to the various hypotheses {F',F} in the respective frame of discernment $\Theta_i$ (index "i" likewise indicating jump or drift). In addition, each first order frame block 30(i) generates a belief value indicating the probability that the presence or absence of the respective feature (jump or drift) cannot be determined; this corresponds to the {F',F} hypothesis of the power set $2^{\Theta_i}$ for the frame of discernment $\Theta_i$. These hypotheses correspond to the rows, for each frame in the table of FIG. 4, with hypotheses {F}, {F'} and {F',F} represented in the second column.

After the module 15 generates the belief values for the first order frames $\Theta_j$ and $\Theta_d$, blocks 31(j) and 31(d), which, pursuant to the aforesaid convention are together identified as block 31i. Block 31i distributes the belief values over the composite frame $\Theta_{JD}$ in the manner defined in FIG. 4. A combination block 32, in response to the belief values in the composite frame received from blocks 31(j) and 31(d), combines the belief values, in the manner described above in connection with equations 3 and 4 and as shown in the table depicted in FIG. 5. The combined belief values produced by block 32, which are still in the $\Theta_{JD}$ frame of discernment, are accumulated by a block 33, which provides them to a block 34 that distributes the belief values over hypotheses comprising frame $\Theta_{JDwms}$ in the manner similar to that shown in FIG. 6.

Similarly, feature belief amplitude determination module 16 receives probability distribution information for respective k-th order Kalman regression coefficients from the evidence extraction module 14 at first order frame blocks 40(j) and 40(d) (generally identified by reference numeral 40(i)). Each of the first order frame blocks 40(i) generates, in a manner to be described below, belief values indicating the belief that the indicated feature (jump or drift) has a weak, moderate or strong amplitude, for first-order frame of discernment $\Theta_{wms}$. After the module 16 generates the belief values for the first order frame $\Theta_{wms}$ blocks 41(j) and 41(d) (generally identified by reference numeral 41(i)) distribute them over the composite frame $\Theta_{JDwms}$, in the manner similar to that shown in FIG. 6. A combiner block 42, in response to the belief values in the composite frame received from blocks 41(j) and 41(d), combines the belief values, in the manner described above in connection with equations 3 and 4 and is similar to that shown in the table depicted in FIG. 5. The combined belief values produced by block 42, which are still in the $\Theta_{JDwms}$ frame of discernment, are accumulated by a block 43.

Belief values from blocks 33 and 43, which are both in the frame $\Theta_{JDwms}$, are provided to a combiner block 44 in the evidential reasoner module 17. Combiner block 44 combines the belief values in the manner described above with respect to equations 3 and 4, to generate combined belief values, which are used by the evidential reasoner module 17 and model selection module 18 to select alternate tracking model data representing one or more alternate tracking models from the alternate model store 19, as described above in connection with FIG. 1.

With this background, the operation of the evidence extraction module 14, the feature belief existence resolution module 15 and the feature belief amplitude determination module 16 in generating the belief values for the respective first-level frames of discernment $\Theta_j$, $\Theta_d$ (by module 15) and $\Theta_{wms}$, (by module 16) will be described in detail in connection with FIGS. 9A through 12. As described above the target state estimator module 11 (FIG. 1) initially processes the input data sequence in relation to the initial tracking model (during the first iteration) or in relation to selected alternate tracking models (during subsequent iterations) to generate target state estimation data (step 100, FIG. 9A), and in the process thereof generates residual values to reflect the difference between the data sequence and the likely target track (step 101). Thereafter, the evidence extraction module 14, which in one embodiment may comprise a Kalman filter of selected order, estimates a regression fit of the residual values (step 102). In those operations, if the vector "m" comprises elements $a_i$ $$\hat{m} = [\hat{a}_0 \ \hat{a}_1 \ a\hat{a}_2]^T \qquad (5)$$

where elements $a_i$ ("i" is an index from 0 to k–1) represent regression coefficients associated with each of the features of jump, drift, and curvature, respectively, and reflecting the correlation between the input data sequence, of "n+1" time samples, which are typically but not necessarily equally spaced, and the expected data sequence as reflected by a particular model, and array B is an (n+1) by (k) matrix $$B = \begin{bmatrix} 1 & t_0 & t_0^2 \\ 1 & t_1 & t_1^2 \\ \cdot & \cdot & \\ \cdot & \cdot & \\ \cdot & \cdot & \\ 1 & t_n & t_n^2 \end{bmatrix} \qquad (6)$$

where "$t_q$" (index "q" is an integer from zero to "n") represents the values of the "n+1" equally spaced time samples of the input data from the data input 12, then the smoothed sequence of residual values, represented by a vector M of "n+1" elements "$r_q$", corresponds to $$l = Bm \qquad (7)$$

Although only the feature present frame $\Theta_p$ (which corresponds to the union of $\Theta_j$ and $\Theta_d$) is directed to features of jump and drift, which relate to zero and first order Kalman regression coefficients, higher order coefficients, such as a second-order curvature coefficient is also used to ensure that the probability values are correctly determined. (It will be appreciated that vector "m" is related to matrix "B" by the equation $$\hat{m} = [B^T B]^{-1} B^T [Z - Z_0(\hat{X})] \qquad (8)$$

where "$Z_0(\hat{X})$" are the predicted measurements associated with the null hypothesis model provided by the target state estimator 11 for target state estimate "$\hat{X}$".)

It will be appreciated that each of the "n+1" elements "$r_q$" of the vector M represents a measure of the difference between the "q-th" time sample input data and the input data which would be represented by the selected model as reflected in the values of the regression coefficients "$a_i$." It will be further appreciated that, although the equations 5 through 8 have been described as having three regression coefficients associated with jump, drift and curvature, respectively, it may be desirable to provide additional regression coefficients, representing higher values of index "k" to obtain unbiased estimates of the residual values for these three features. The additional coefficients may be related to higher-order features which may be present in the input signal data.

After the evidence extraction module 14 has generated the smoothed residual sequence M, the feature belief existence resolution module 15 uses this sequence to establish values of the thresholds to indicate the probability that the particular features are present or are not present in the input data sequence, with the thresholds being determined in relation to the signal to noise ratio for the signal represented by the received input data (step 103). In this operation, the module 15 first (step 110) determines for each feature a test statistic value $l_i$, $$l_i = \frac{[M_i - M]^2}{\sigma^2} \qquad (9)$$

where "$[M_i - M]^2$" in equation 9 represents the scalar ("dot") product of vector "$M_i - M$," "M" in equation 9 represents the vector of "n+1" elements "$r_q$" which is determined in accordance with equation 7 including all of the regression coefficients "$a_i$" (equation 5), "$M_i$" in equation 9 represents the vector of "n+1" elements "$r_{qi}$" which is determined in accordance with equation 7, except that for vector "m" in equation 8 the coefficient "$a_i$" related to the "i-th" feature (index "i" referencing the features jump, drift and curvature) are set to zero, and "$\sigma$" corresponds to a previously-measured standard deviation of noise which may be determined in connection with received reference signals.

The differences between the smoothed residual sequences $M_i$ and M in equation 4 provides, for feature "i," a residual value representative of the significance of the "i-th" feature, and thus the test statistic $l_i$ provides, for that "i-th" feature, an estimate of the signal to noise ratio of the signal represented by the input data.

Figure 7:
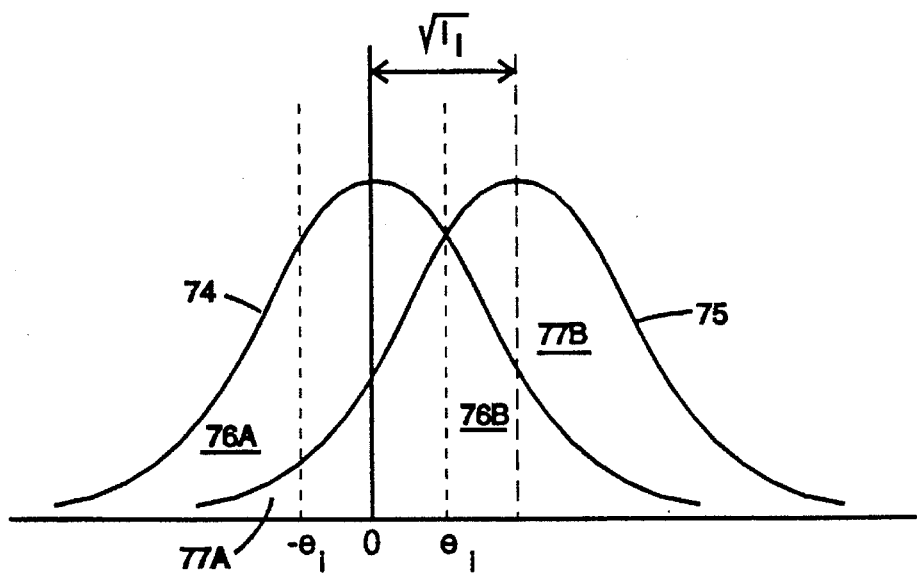

It will be appreciated that, for the condition of Gaussian additive noise on the received data, the test statistic $l_i$, for each feature "i," statistically represents a "chi-squared" variable with one degree of freedom, namely that for the "i-th" feature. It will be recognized by one skilled in the art that the test statistic $l_i$ is therefore related to the square of a Gaussian random variable (step 111), and the probability distribution in connection with both the elements "$r_q$" of the residual sequence "M" and the elements "$r_{qi}$" of sequence $M_i$ is essentially the well-known Gaussian distribution or "bell-shaped curve" (see, for example, FIG. 7). (It will be evident to one skilled in the art, however, that the following discussion is not limited to the assumption of a Gaussian noise distribution.) In the probability distribution, if the "i-th" feature is actually not present, the expected value of the test statistic "$l_i$" would be zero and so the probability distribution would be represented by a Gaussian, or bell-shaped curve, distribution having a zero average value, depicted in FIG. 7 as curve 74. On the other hand, if the "i-th" feature is present, the Gaussian-shaped probability distribution would have the same "bell-shaped curve" shape, but it would be displaced by an amount corresponding to the square root of the test statistic "$l_i$," depicted in FIG. 7 as curve 75. In one embodiment, the threshold value "$e_i$" for the "i-th" feature is taken as the point at which the presence or absence of the feature is equally likely, which, since the two curves have the same symmetric shape around their respective average values, corresponds to one-half of the distance between their average value (step 112):

$$e_i = \frac{1}{2} \sqrt{l_i} \qquad (10)$$

The feature belief existence resolution module 15 determines the threshold value "$e_i$" for each of the "i" features, using equations 9 and 10. Since the threshold value "$e_i$" is a function of the test statistic $l_i$, which itself is a function of the signal to noise ratio of the input data, the threshold value itself is a function of the signal to noise ratio of the input data.

After the feature belief existence resolution module 15 has determined the threshold value "$e_i$" for the "i-th" feature (step 103), that threshold value is used (step 113) to determine probability values indicating the likelihood that the feature is present (step 104) and absent (step 105), as well as the probability that the presence or absence of the feature is not determinable from the input data (step 106). The feature belief existence resolution module 15 determines the probability "$Pp_i$," that the "i-th" feature is present (step 104), as the difference between a detect probability value "$Pd_i$" representing the probability that the "i-th" feature is detected given the input data and the particular signal-to-noise ratio, and a false alarm probability value "$Pf_i$," representing the probability that the "i-th" feature is not present given the input data and the particular signal-to-noise ratio. In that operation, module 15 uses the zero-average Gaussian probability distribution (that is, curve 74) determined in step 103 as described above, which reflects the absence of the "i-th" feature, as well as the non-zero average Gaussian probability distribution (that is, curve 75), also determined as described above, which reflects the presence of the "i-th" feature, and the threshold value "$e_i$" in step 103.

In determining both the detect probability value, $Pd_i$, and the false alarm probability value "Pf", the feature belief existence resolution module 15 uses the regions of the respective Gaussian probability distributions which are beyond zero by an amount corresponding to the threshold value "$e_i$" in step 103.

In both cases, the module 15 excludes a portion of the respective probability distributions which are within a region less than the threshold value "$e_i$" around zero. In determining the false alarm probability value "$Pf_i$", the module 15 uses the Gaussian probability distribution represented by curve 74, which assumes the absence of the feature (that is, the zero-average distribution), and determines the total probability in the region of the distribution which is beyond a zero by amounts more than the threshold "$e_i$" (that is, the regions of curve 74 less than "$-e_i$" and greater than "$e_i$" as shown in dotted line on FIG. 7). In that determination, module 15 essentially determines the integral of the Gaussian distribution outside of the threshold, which corresponds to the area under the portions of curve 74 identified by reference numerals 76A and 76B.

Similarly, for the detect probability value $Pd_i$, the feature belief existence resolution module 15 uses the Gaussian probability distribution represented by curve 75 which assumes the presence of the feature (that is, the non-zero-average distribution), and determines the total probability value of the portion of the distribution beyond the same values (that is, the regions of curve 75 less than the threshold value "$-e_i$" and greater than the threshold value "$e_i$" as shown in dotted line on FIG. 6), which corresponds to the area under the portions of curve 75 identified by reference numerals 77A and 77B.

In both cases, the feature belief existence resolution module 15 essentially determines the integral of the Gaussian distributions with respect to the same threshold. The probability that a particular feature is present, as determined in step 104, is the difference between the detect and false alarm probability values, or $$Pp_i = Pd_i - Pf_i \quad (11)$$

which, it will be appreciated, corresponds to the belief value $m_i(F)$ that the "i-th" feature (jump or drift) is present and corresponds to the feature present hypothesis {F} of the frame of discernment $\Theta_i$ (see FIG. 4).

In determining a probability value $Pn_i$ reflecting the probability that the "i-th" feature is not present (step 105, shown in greater detail in FIG. 11), the feature belief existence resolution module 15 makes use of detect and false alarm probabilities, $Pd_r$ and $Pf_r$, respectively, for a reference signal (steps 120 and 121), as well as the previously-determined false alarm probability value (step 104). In particular, the probability value $Pn_i$ makes use of the false alarm probability value $Pf_i$ for the "i-th" feature, as that reflects a probability of failure in the detection of the feature, but scales it by a probability value that the feature would have been detected if it were present. In concert with the equation 11, the probability that the feature would have been detected corresponds to the difference between the detect and false alarm probability values $Pd_r$ and $Pf_r$, respectively (step 121). Accordingly, the probability $Pn_i$ that the "i-th" feature is not present (step 122) corresponds to:

$$Pn_i = (Pd_r - Pf_r)Pf_i \quad (12)$$

which, it will be appreciated, corresponds to the belief value $m_i(F')$ that the "i-th" feature (jump or drift) is not present and corresponds to the feature absent hypothesis {F'} of the frame of discernment $\Theta_i$ (see FIG. 4).

Finally, the feature belief existence resolution module 15 determines in step 106 (shown in greater detail in FIG. 12) a probability value $Pu_i$ representing the likelihood that the presence or absence of the "i-th" feature can not be determined. It will be appreciated, that this probability value $Pu_i$ corresponds to the belief value $mi(F,F')$ that the existence of "i-th" feature (jump or drift) is uncertain and corresponds to the indeterminate hypothesis {F, F'} of the frame of discernment $\Theta_i$ (see FIG. 4). Since all three probabilities must add up to unity, the feature belief existence resolution module 15 determines the value of $Pu_i$ (steps 130 and 131) as:

$$Pu_i = 1 - (Pp_i + Pn_i) \quad (13)$$

which corresponds to:

$$Pu_i = 1 - Pd_i + [1 - (Pd_r - Pf_r)]Pf_i \quad (14)$$

As noted above, the feature belief amplitude determination module 16, in particular blocks 40(j) and 40(d), generates belief values for the frame of discernment $\Theta_{wms}$. In generating a value for a particular feature "i" (jump or drift) the module 16 essentially assumes that the i-th feature exists, and generates a value indicating whether the estimated feature amplitude falls in regions arbitrarily labelled as weak, moderate or strong. The feature belief amplitude determination module 16 generates belief values and distributes them over the various hypotheses {W} (weak), {M} (moderate) and {S} (strong) of the first-order frame $\Theta_{wms}$, in the following manner.

Figure 8:
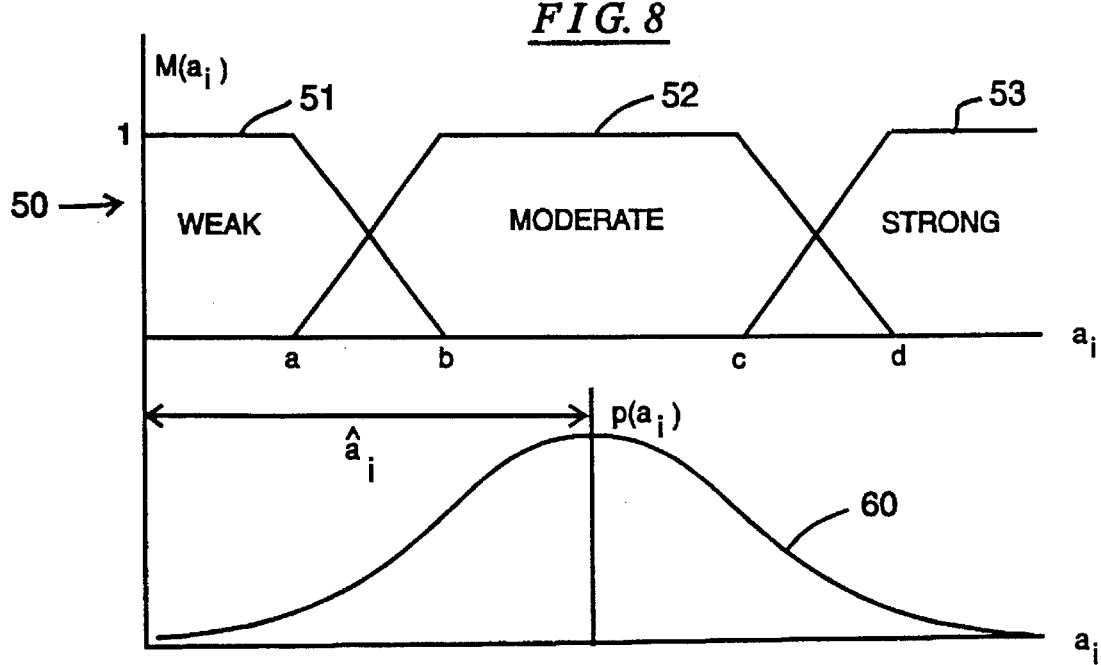
Figure 9A:
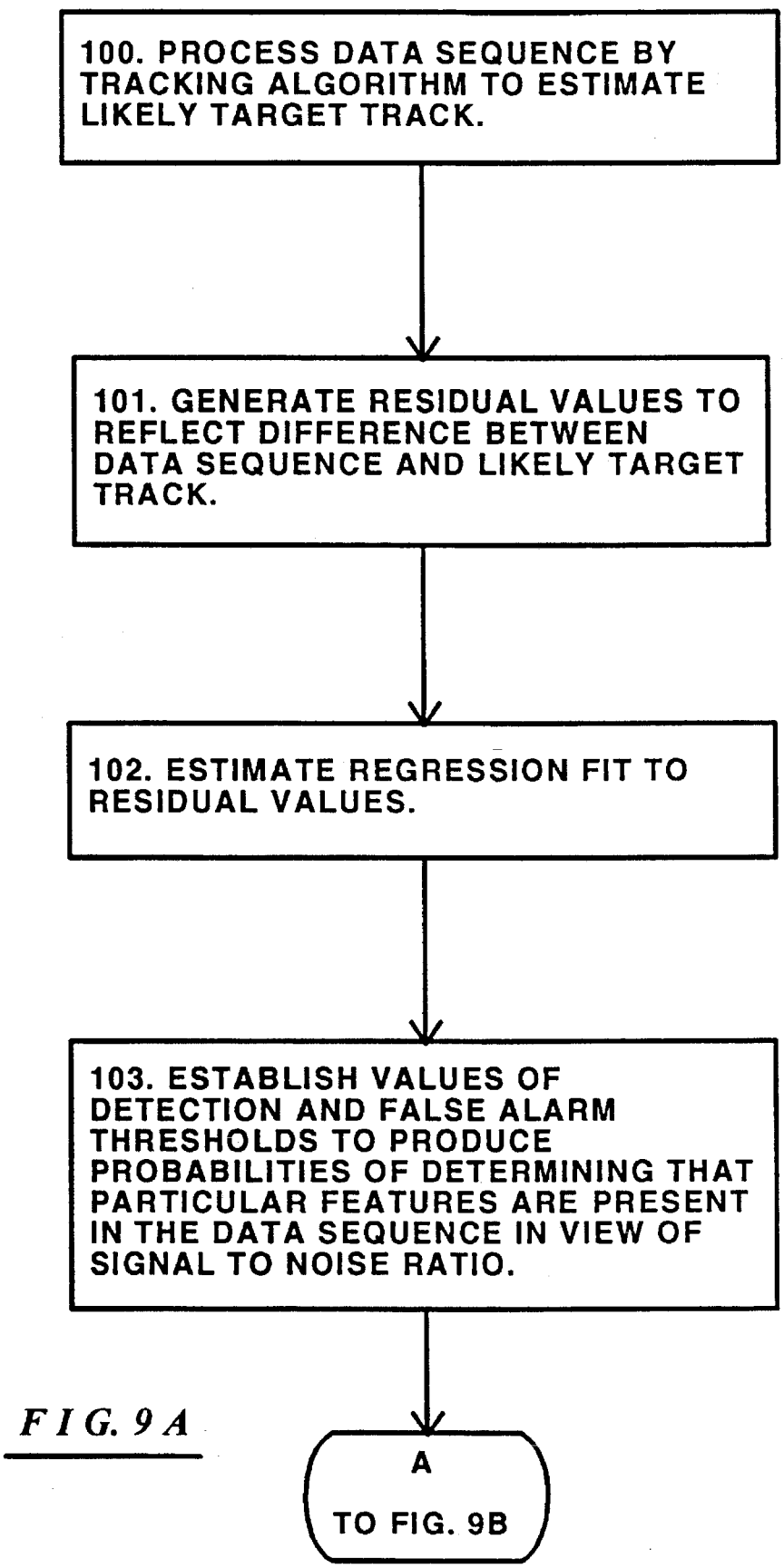
FIGS. 9A, 9B, 10, 11 and 12 are a series of flow charts helpful in understanding the sequence steps involved in operation of the system depicted in FIG. 1.
Figure 9B:
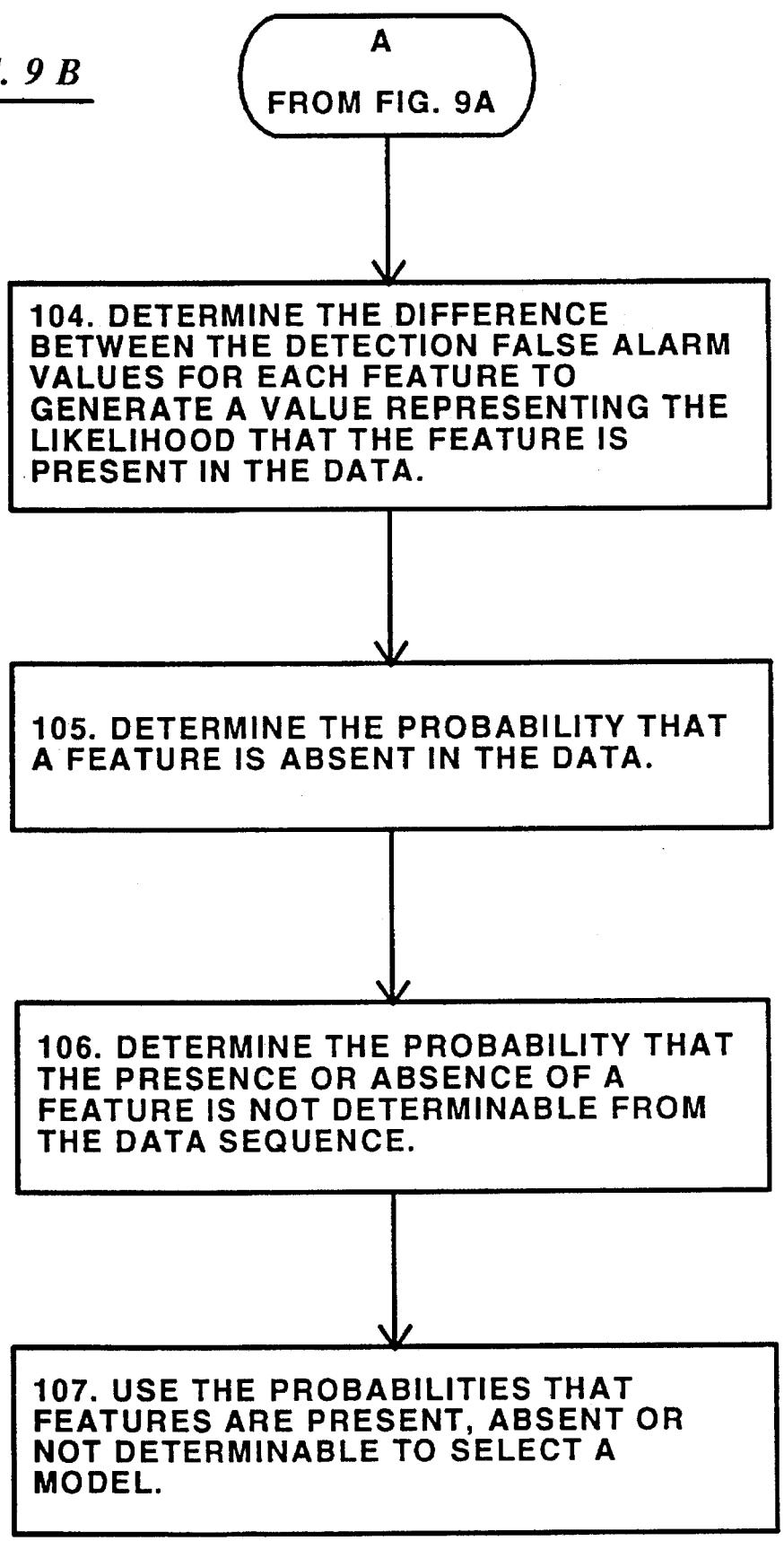
Figure 10:
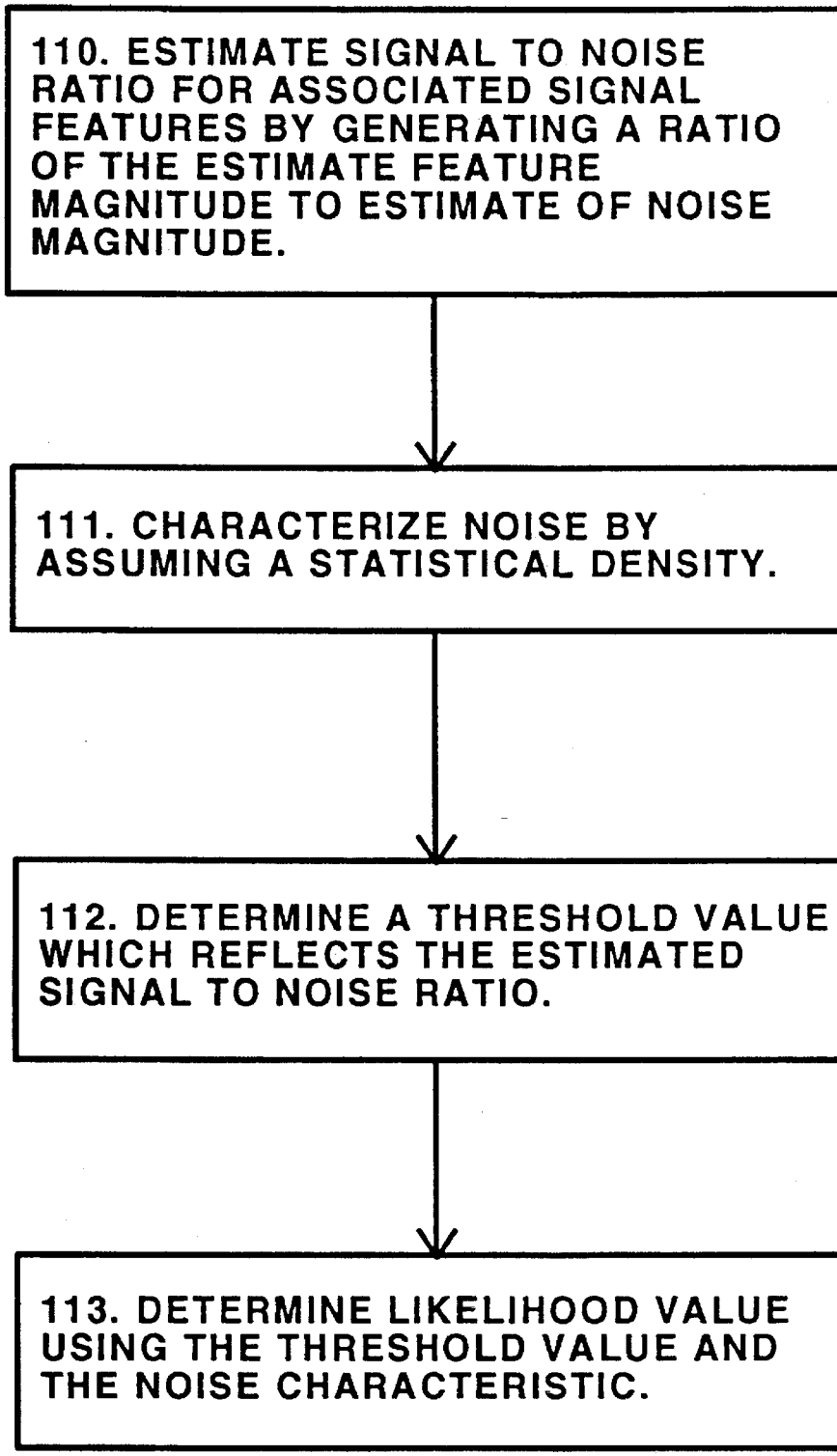
Figure 11:
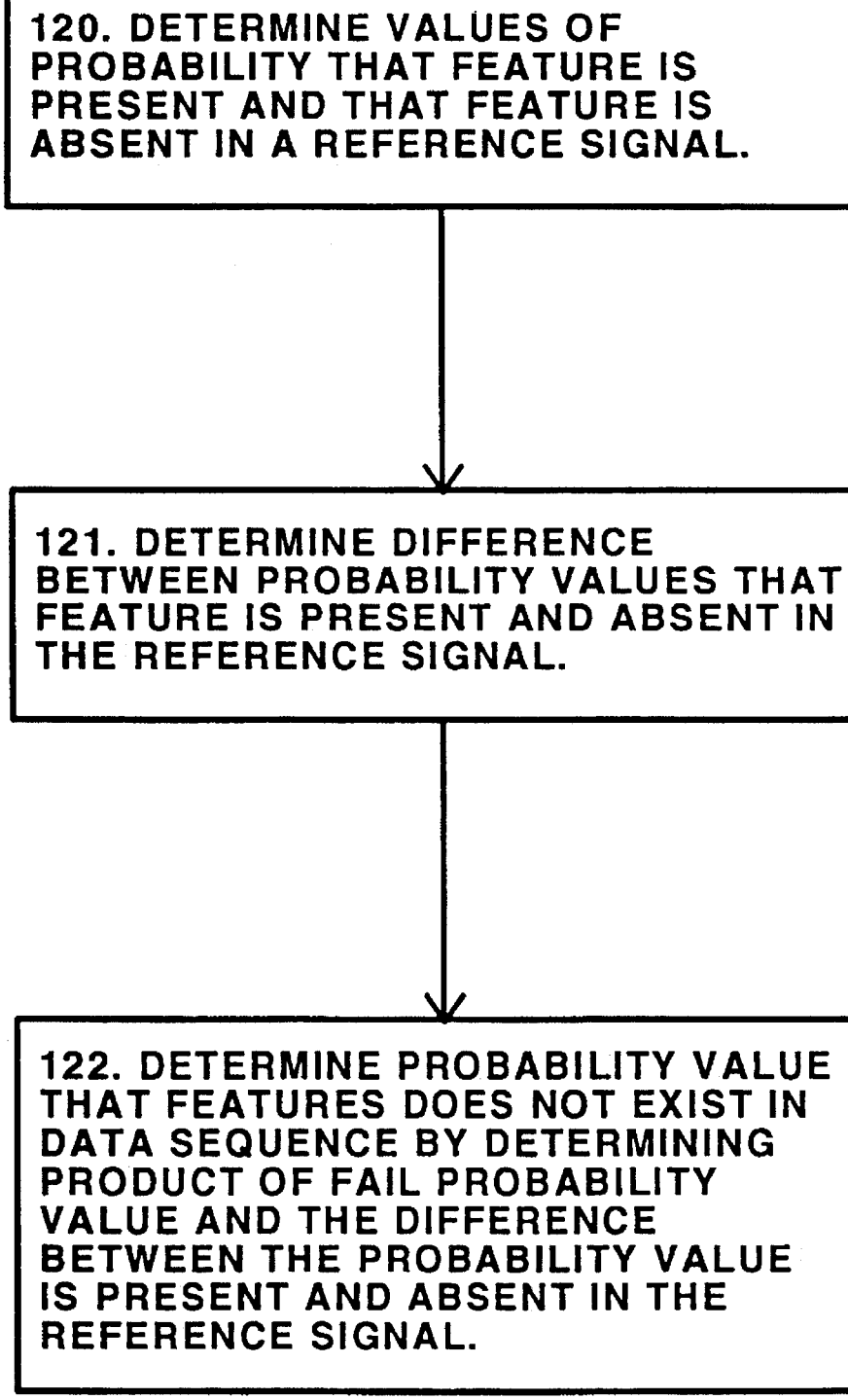
Figure 12:

In one embodiment, module 16 makes use of "membership functions," as shown in FIG. 8, to define regions for the various hypotheses {W}, {M} and {S} of the frame $\Theta_{wms}$ for a particular feature "jump" or "drift." With reference to FIG. 8, that FIG. depicts two graphs, including a membership function graph 50 for each feature jump and drift, and the second being a function of the values of "k-th" order Kalman filter regression coefficient values "$a_i$" (equations 5 through 8 above), which are provided to the module 16 by the evidence extraction module 14. The membership function graph 50 depicts graphs of three membership functions, including a weak membership function graph 51, a moderate membership function graph 52 and a strong membership function graph 53. Weak membership function graph 51 depicts the weak membership function as having the value one for values of the "k-th" order Kalman filter regression coefficient $a_i$ between zero and a selected value "a", tapering linearly to zero for values of $a_i$ between "a" and a selected value "b." Moderate membership function graph 52 depicts the moderate membership function as having the value one for values of $a_i$ between value "b" and value "c", increasing linearly from zero to one for values of $a_i$ between "a" and "b" and decreasing linearly from one to zero for values of $a_i$ between "c" and "d." Similarly, the strong membership function depicts the strong membership function as having the value one for values of $a_i$ above "d," and increasing linearly from zero to one for values of $a_i$ between "c" and "d." It will be appreciated that the regions "a" to "b" and "c" to "d" define fuzzy regions for "weak" and "moderate" membership and "moderate" and "strong" membership, respectively. It is noted that, in the preferred embodiment, the membership function graph 50 is two-sided with the negative side a mirror image of that shown in FIG. 8; however, this symmetry is not a necessary condition, that is, the lower limit for weak "e" need not be the negative of "a," etc.

It will further be appreciated that each region defines values of the regression coefficients $a_i$ which are associated with the diverse hypotheses "weak," "moderate," and "strong" for the frame of discernment $\Theta_{wms}$. It will also be appreciated that, if there are more hypotheses for the frame, additional membership functions may also be provided, including membership functions associated with negative values of regression coefficients $a_i$.

FIG. 8 also depicts a graph 60 of an illustrative probability distribution function for the Kalman regression coefficients $a_a$. The graph 60 depicted in FIG. 8 assumes, for purposes of illustration, that the coefficients $a_i$ is a Gaussian distribution, with the coefficients $a_i$ having an average value â and a standard deviation σ, both of which the feature belief amplitude determination module 16 receives from the evidence extraction module 14.

The feature belief amplitude determination module 16 uses the definition of the membership functions (graphs 50 in FIG. 8) and the probability distribution function (illustratively defined by the average value â and a standard deviation σ for a Gaussian distribution) in the following manner. Initially, the module 16 determines $$I_{jB} = \int_{lower}^{upper} M_j(a_i)P(a_i)da_i, [lower,upper] \in [0,a],[b,c],[d,\ldots] \quad (15)$$

$$I_{jl} = \int_{lower}^{upper} M_j(a_i)P(a_i)da_i, [lower,upper] \in [a,b],[c,d] \quad (16)$$

where equation 15 represents the integral over the interval at which the respective membership function has the value one, and equation 16 represents the integral over the fuzzy interval. (It will be appreciated that the integrals in equations 15 and 16 are similar to the expected value operator in statistics.) The total expected belief in the weak, moderate and strong hypotheses are, respectively $$m_w'(a_i) = I_{wB} + I_{wI} \quad (17)$$

$$m_m'(a_i) = I_{mB} + (I_{mI1} + I_{mI2}) \quad (18)$$

($I_{mI1}$ and $I_{mI2}$ represent the value of the integral 16 in the lower and upper fuzzy regions [a,b] and [c,d] respectively) and $$m_s'(a_i) = I_{sB} + I_{sI} \quad (19)$$

The module 16 uses the values of $m_w'(a_i)$, $m_m'(a_i)$ and $m_w'(a_i)$ generated using equations 17 through 19 to apportion belief values to the hypotheses of the power set (FIG. 2) of the frame of discernment $\Theta_{wms}$ in the following manner. Initially, module 16 assumes that belief can be placed in a singleton hypothesis {W}, {M} and {S} if its belief is greater than the belief in the other hypotheses. The remainder of the belief is added to the doublet hypothesis {W,M} or {M,S} (the doublet hypothesis {W,S} is nonsensical in this context and thus is not used), with the amount added to the doublet being twice the amount by which the belief in the second hypothesis of the double exceeds the belief in the third hypothesis. This process is repeated until all of the belief has been distributed. With reference to the three-hypothesis embodiment {W}, {M} and {S} described herein, then module 16 determines the belief values as:

$$m_s = MAX[m_s'(a_i) - MAX[m_m'(a_i), m_w'(a_i)], 0] \quad (20)$$

$$m_m = MAX[m_m'(a_i) - MAX[m_s'(a_i), m_w'(a_i)], 0] \quad (21)$$

$$m_w = MAX[m_w'(a_i) - MAX[m_m'(a_i), m_s'(a_i)], 0] \quad (22)$$

as the belief values in the singleton hypotheses {S}, {M} and {W}, respectively, $$m_{sm} = MAX[2[MIN(m_s'(a_i), m_m'(a_i)) - m_w'(a_i)], 0] \quad (23)$$

$$m_{mw} = MAX[2[MIN(m_w'(a_i), m_m'(a_i)) - m_s'(a_i)], 0] \quad (24)$$

define the beliefs in the doublet hypotheses {S,M} and {M,W}, respectively, and $$m_{smw} = 3MIN[m_s'(a_i), m_m'(a_i), m_w'(a_i)] \quad (25)$$

(which corresponds to the value one minus the sum of the beliefs determined in connection with equations 20–24) is the belief in the triplet {S, M, W}. The module 16, in particular the blocks 40(j) and 40(d) use equations 15–25 to determine the belief values for the frame $\Theta_{wms}$ in connection with the respective "k-th" order Kalman regression coefficients.

As noted above, the system 10 (FIG. 1) operates in a series of iterations. After determining the feature existence belief values $Pp_i$, $Pn_i$ and $Pu_i$, in connection with equations 11–13, along with the feature amplitude belief values in connection with equations 20–25 for all of the "k" features for all of the measurement types, and for all of the selected models, for a current iteration, the evidential reasoner module 17 uses the probability values as indicating the likelihood that either the current model, used by the target state estimator module 11 during the iteration, or one of the other models in the alternate model store 19 is the correct model (step 107, FIG. 9B). Accordingly, the probability values generated for each model processed during a current iteration in enabling the model selection module 18 (FIG. 1) are used to select one or more models from the plurality of models whose model state information is maintained in the alternate model store 19. The store 19 couples the model state information for the selected model(s) to the target state estimator module 11 for use in a next iteration.

The system 10 repeats the operations described above through a series of iterations until it determines that predetermined termination criteria has been satisfied. In one embodiment the system 10 terminates operations when it determines that substantially the same models are selected in consecutive iterations. Alternatively, the system 10 may proceed through a predetermined number of iterations, during each iteration the model selection module 18 selecting models based on predetermined selection criteria relating to the determined probability values. After the iterations have been terminated, the system 10 enables the target track utilizer 20 to use the model information regarding the finally-selected model(s) as described above.

It will be appreciated that the system 10 may be embodied in a suitably programmed digital computer, or alternatively in special purpose hardware.

The invention provides a number of advantages. Since the system uses probability values representing the likelihood that the various features are present, absent, or that the presence or absence is not determinable, as well as threshold values, based on the signal-to-noise ratio of the input data sequence, it is better able to select models and to determine the accuracy of a selected model.

Although the invention has been described in terms of a system 10 in connection with processing of signals from a hydrophone array to determine a model of movement of a target, it will be appreciated that the invention may find far wider usage. For example, the invention may be useful in connection with interpretation of seismic signals with only minor modifications, which would be apparent to those skilled in the art, to provide indication of the degree of belief in the presence or absence of oil or mineral deposits.

Similarly, the invention may be useful in connection with processing of signals from sensors placed on structures, such as bridges, buildings, aircraft, or the like, to determine the belief, or likelihood in the existence of flaws and likelihood of failure. Such a system could further provide an indication of the amount of belief that the failure determination may be due to traffic or other possible hypotheses (in the case of bridges, for example), and provide a range in the certainty, thereby indicating the quality of the data and the possible necessity for further testing. In the case of aircraft, such a system may provide an indication in the belief in the existence structural flaws such as the presence of cracks and possible flaws in welds.

In addition, the invention may be useful in connection with image processing, in particular in connection with a system for scanning images and interpreting the images so as to identify objects that may be present therein. Such images may be provided by conventional photographic methods (and thus such a system may be useful in, for example, computer or robotic vision) or by such advanced medical imaging techniques as magnetic resonance imaging, x-ray tomography or the like (and thus such a system may be useful in medical diagnostic regimens, to provide a belief for a particular diagnosis).

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A system for assessing accuracy of selected models of physical phenomena and for determining selection of alternate models in response to a data sequence representing values of a signal in the presence of noise comprising:

a residual value generator for generating a residual sequence in response to difference values between the data sequence and an expected data sequence as would be represented by a selected model;

a feature estimate determination module for generating feature estimate values of a plurality of predetermined data features in the residual sequence generated by the residual value generator;

a threshold determination module for generating, in response to the feature estimate values generated by the feature estimate determination module, a threshold value for each feature at an estimated ratio of data to noise;

a feature existence probability value generator for generating, in response to the threshold value, probability values representing the likelihood that the feature exists in the data sequence, does not exist in the data sequence, and that the existence or non-existence in the data sequence is not determinable;

a feature amplitude probability value generator for generating an amplitude belief value indicating the belief of the amplitude of the respective feature in the data sequence;

a model selection module for selecting a model in response to the probability values generated by the feature existence probability value generator and the feature amplitude probability value generator; and a control module for controlling the operations of residual value generator, the feature estimate determination module, the threshold determination module, the feature existence probability value generator, the feature amplitude probability value generator and the model selection module in a plurality of iterations, during each iteration the residual value generator module using the model selected by the model selection module during the previous iteration.

2. A system as defined in claim 1 in which said threshold determination module includes:

a test statistic value generator for generating, for each feature, a test statistic value in response to a difference between a regression fit to the residual sequence both with and without regard to the feature, and in further response to a predetermined noise value; and a threshold value generator for generating said threshold value as a function of said test statistic.

3. A system as defined in claim 2 in which said function is selected so that a statistical distribution of parameter estimates of the regression fit to the residual values with regard to the feature and the corresponding statistical distribution of parameter estimates of the regression fit to the residual values without regard to the feature are the same.

4. A system as defined in claim 1 in which said feature existence probability value generator includes:

a feature present probability value generator for generating, in response to a statistical distribution function representing a statistical distribution of the residual values with regard to the feature and the corresponding statistical distribution of the residual values without regard to the feature, and the threshold value, a feature present probability value representing a likelihood that the feature is present in the data sequence;

a feature absence probability value generator for generating, in response to the statistical distribution function and the threshold value, a feature absent probability value representing a likelihood that the feature is absent from the data sequence; and a feature indeterminable probability value generator for generating, in response to the feature present probability value and the feature absent probability value, a feature indeterminable probability value representing a likelihood that the presence or absence of the feature in the data sequence is indeterminable.

5. A system as defined in claim 4 in which the feature existence probability value generator further includes:

a feature detection probability generator for generating a feature detect probability value in response to the statistical distribution function and the threshold value; and a feature detection false alarm probability generator for generating a feature detection false alarm probability value in response to the statistical distribution function and the threshold value.

6. A system as defined in claim 5 in which the feature present probability value generator generates said feature present probability value as a difference between the feature detect probability value and the feature detection false alarm probability value.

7. A system as defined in claim 5 in which the feature detection probability generator and said feature detection false alarm probability generator further generate a reference feature detect probability value and a reference feature detection false alarm probability value in response to a reference statistical distribution function and a threshold value, the feature absence probability value generator generating the feature absence probability value in response to the reference feature detect probability value and a reference feature false alarm probability value and the feature detection false alarm probability value.

8. A method of assessing accuracy of selected models of physical phenomena and for determining selection of alternate models in response to a data sequence representing value of a signal in the presence of noise, the method comprising the steps of iteratively:

generating a residual sequence in response to difference values between the data sequence and an expected data sequence as would be represented by a selected model;

generating feature estimate values of a plurality of predetermined data features in the residual sequence;

generating, in response to the feature estimate values, a threshold value for each feature at an estimated ratio of data to noise;

generating, in response to the threshold value, feature existence probability values representing the likelihood that the feature exists in the data sequence, does not exist in the data sequence, and that the existence or non-existence in the data sequence is not determinable;

generating an amplitude belief value indicating the belief of the amplitude of the respective feature in the data sequence; and selecting a model in response to the probability values and the amplitude belief value for use during a subsequent iteration.

9. A method as defined in claim 8 in which said threshold value generating step includes the steps of:

generating, for each feature, a test statistic value in response to a difference between regression fits to the residual sequence with and without regard to the feature, and in further response to a predetermined noise value; and generating said threshold value as a function of said test statistic.

10. A method as defined in claim 9 in which said function is selected so that a statistical distribution of the residual values with regard to the feature and the corresponding statistical distribution of the residual values without regard to the feature have a selected relationship.

11. A method as defined in claim 8 in which said feature existence probability value generating step includes the steps of:

for generating, in response to a statistical distribution function representing a statistical distribution of the residual values with regard to the feature and the corresponding statistical distribution of the residual values without regard to the feature, and the threshold value, a feature present probability value representing a likelihood that the feature is present in the data sequence;

generating, in response to the statistical distribution function and the threshold value, a feature absent probability value representing a likelihood that the feature is absent from the data sequence; and generating, in response to the feature present probability value and the feature absent probability value, a feature indeterminable probability value representing a likelihood that the presence or absence of the feature in the data sequence is indeterminable.

12. A method as defined in claim 11 in which the feature existence probability value generating step further includes the steps of:

generating a feature detect probability value in response to the statistical distribution function and the threshold value; and generating a feature detection false alarm probability value in response to the statistical distribution function and the threshold value.

13. A method as defined in claim 12 in which the feature present probability value generating step includes the step of generating said feature present probability value as a difference between the feature detect probability value and the feature detection false alarm probability value.

14. A method as defined in claim 12 in which the feature detection probability generating step and said feature detection false alarm probability generating step further include the steps of generating a reference feature detect probability value and a reference feature detection failure probability value in response to a statistical distribution function and a threshold value for a reference feature and the predetermined noise value, the feature absence probability value being generated in response to the reference feature detect reference probability value and a reference feature detection false alarm probability value and the feature false alarm probability value.

15. A system for use in connection with a computer to assess accuracy of selected models of physical phenomena and for determining selection of alternate models in response to a data sequence representing value of a signal in the presence of noise comprising:

a residual value generator module for controlling the computer to generate a residual sequence in response to difference values between the data sequence and an expected data sequence as would be represented by a selected model;

a feature estimate determination module for controlling the computer to generate feature estimate values of a plurality of predetermined data features in the residual sequence;

a threshold determination module for controlling the computer to generate, in response to the feature estimate values, a threshold value for each feature at an estimated ratio of data to noise;

a feature probability value generator module for controlling the computer to generate, in response to the threshold value, probability values representing the likelihood that the feature exists in the data sequence, does not exist in the data sequence, and that the existence or non-existence in the data sequence is not determinable;

a feature amplitude probability value module for controlling the computer to generate an amplitude belief value indicating the belief of the amplitude of the respective feature in the data sequence;

a model selection module for controlling the computer to select a model in response to the feature existence probability values and feature amplitude probability values; and a control module for controlling the operations of the computer in response to the residual value generator module, the feature estimate determination module, the threshold determination module, the feature existence probability value generator module, the feature amplitude and the model selection module in a plurality of iterations, during each iteration the computer in response to the residual value generator module using the model selected by the model selection module during the previous iteration.

16. A system as defined in claim 15 in which said threshold determination module includes:

a test statistic value generator module for controlling the computer to generate, for each feature, a test statistic value in response to a difference between a regression fit to the residual sequence both with and without regard to the feature, and in further response to a predetermined noise value; and a threshold value generator module for controlling the computer to generate said threshold value as a function of said test statistic.

17. A system as defined in claim 16 in which said function is selected so that a statistical distribution of parameter estimates of the regression fit to the residual values with regard to the feature and the corresponding statistical distribution of the parameter estimates of the regression fit to the residual values without regard to the feature are the same.

18. A system as defined in claim 15 in which said feature existence probability value generator module includes:

a feature present probability value generator module for controlling the computer to generate, in response to a statistical distribution function representing a statistical distribution of the regression fit to the residual values with regard to the feature and the corresponding statistical distribution of the regression fit to the residual values without regard to the feature, and the threshold value, a feature present probability value representing a likelihood that the feature is present in the data sequence;

a feature absence probability value generator module for controlling the computer to generate, in response to the statistical distribution function and the threshold value, a feature absent probability value representing a likelihood that the feature is absent from the data sequence; and a feature indeterminable probability value generator module for controlling the computer to generate, in response to the feature present probability value and the feature absent probability value, a feature indeterminable probability value representing a likelihood that the presence or absence of the feature in the data sequence is indeterminable.

19. A system as defined in claim 18 in which the feature existence probability value generator module further includes:

a feature detection probability generator module for controlling the computer to generate a feature detect probability value in response to the statistical distribution function and the threshold value; and a feature detection false alarm probability generator module for controlling the computer to generate a feature false alarm probability value in response to the statistical distribution function and the threshold value.

20. A system as defined in claim 19 in which the feature present probability value generator module controls the computer to generate said feature present probability value as a difference between the feature detect probability value and the feature detection false alarm probability value.

21. A system as defined in claim 19 in which the feature detection probability generator module and said feature detection false alarm probability generator module further control the computer to generate a reference feature detect probability value and a reference feature detection false alarm probability value in response to a reference statistical distribution function and a threshold value, the feature absence probability value generator module controlling the computer to generate the feature absence probability value in response to the reference feature detect probability value and a reference feature false alarm probability value and the feature false alarm probability value.

* * * * *